United States Patent
Grosse Bley et al.

(10) Patent No.: US 7,971,471 B2
(45) Date of Patent: Jul. 5, 2011

(54) QUARTZ WINDOW GAS SENSOR WITH HEATED MEMBRANE

(75) Inventors: Werner Grosse Bley, Bonn (DE); Daniel Wetzig, Cologne (DE)

(73) Assignee: Inficon GmbH (DE)

( * ) Notice: Subject to any disclaimer, the term of this patent is extended or adjusted under 35 U.S.C. 154(b) by 222 days.

(21) Appl. No.: 12/227,770

(22) PCT Filed: May 4, 2007

(86) PCT No.: PCT/EP2007/054335
§ 371 (c)(1),
(2), (4) Date: Nov. 26, 2008

(87) PCT Pub. No.: WO2007/141098
PCT Pub. Date: Dec. 13, 2007

(65) Prior Publication Data
US 2009/0173141 A1    Jul. 9, 2009

(30) Foreign Application Priority Data
Jun. 3, 2006   (DE) .......................... 10 2006 026 125

(51) Int. Cl.
*G01M 3/20* (2006.01)
*G01N 1/22* (2006.01)
(52) U.S. Cl. .......... 73/40.7; 73/31.05; 73/40; 73/863.51
(58) Field of Classification Search ............. 73/40, 40.7, 73/31.05, 23.2, 863.51
See application file for complete search history.

(56) References Cited

U.S. PATENT DOCUMENTS

| | | | | |
|---|---|---|---|---|
| 2,988,265 A * | 6/1961 | Reich | ............................... | 417/49 |
| 5,916,388 A * | 6/1999 | Shiokawa | ..................... | 148/596 |
| 6,277,177 B1 * | 8/2001 | Bley et al. | ............................ | 96/4 |
| 7,141,096 B2 * | 11/2006 | Carboneri et al. | ................... | 96/4 |
| 7,266,991 B2 | 9/2007 | Bley | ............................. | 73/31.05 |
| 2003/0159929 A1* | 8/2003 | Werner | ......................... | 204/409 |
| 2008/0202211 A1* | 8/2008 | Wetzig | ............................ | 73/40.7 |
| 2009/0100909 A1* | 4/2009 | Grosse Bley et al. | .......... | 73/40.7 |

FOREIGN PATENT DOCUMENTS

| | | |
|---|---|---|
| DE | 10031882 A1 | 1/2002 |
| DE | 10 2004 034 381 | 2/2006 |
| EP | 0 831 964 B1 | 4/1998 |
| EP | 1 441 209 A2 | 7/2004 |
| WO | WO 2006032591 A1 * | 3/2006 |

OTHER PUBLICATIONS

International Search Report dated Oct. 5, 2007 from PCT/EP2007/054335.

\* cited by examiner

*Primary Examiner* — Lisa M Caputo
*Assistant Examiner* — Punam Roy
(74) *Attorney, Agent, or Firm* — Ohlandt, Greeley, Ruggiero & Perle, LLP

(57) ABSTRACT

The gas sensor has a selectively permeable membrane which is composed of silicon material and is provided with a heating device on the outside. The membrane closes an evacuated housing which contains a pressure sensor. When evacuating the area surrounding the housing, the heat dissipation is changed as a result of the quick change in the total pressure of the surrounding air, with the result that signal drift arises despite temperature regulation of the membrane. The disclosure provides at least one second heating device whose temperature is regulated independently of the first heating device. As a result, the membrane temperature is highly constant even in the case of severely changing total pressure in the housing.

9 Claims, 1 Drawing Sheet

QUARTZ WINDOW GAS SENSOR WITH HEATED MEMBRANE

BACKGROUND

1. Field of the Disclosure

The disclosure relates to a gas sensor comprising a housing which is adapted to be evacuated and is closed by a gas-selectively permeable membrane, and comprising a heating device arranged on the membrane.

2. Discussion of the Background Art

DE 100 31 882 A1 (Leybold) describes a gas-selective sensor for helium or hydrogen, which sensor is provided with a housing made of glass or another silicon material and is closed by a selectively gas-permeable membrane. Accommodated in the housing is a gas-pressure sensor for measuring the gas pressure. After evacuation, the resultant gas pressure occurring in the interior of the housing will be indicative of the quantity of the test gas passing through the membrane. The membrane is a silicon disk provided with window-like perforations. In each of said perforations, a helical heating element made of platinum is arranged on a membrane wall. The helical heating elements in their totality form a heating arrangement for heating the membrane so that the membrane will develop the required properties of selective gas-permeability.

EP 0 831 964 B1 (Leybold) describes the production process for a selectively gas-permeable membrane made of silicon. In said process, a silicon disk will on both of its sides be provided with oxidation layers and then be etched, thus maintaining a continuous $SiO_2$ layer only on one side of the disk. In between, window-like perforations are formed for arranging helical heating elements therein by use of methods from the field of thin-film technology.

Described in DE 10 2004 034 381 A (Inficon) is a selective gas sensor wherein the housing is likewise closed by a membrane and includes a gas pressure sensor.

The above mentioned gas sensors are also referred to as quartz window sensors. Gas sensors with gas-selective membranes are used for leak detection when a container or conduit has to be tested for leaks. The test object will be filled with a test gas such as e.g. helium. Then, with the aid of a test-gas sensor, possible escape of test gas is checked externally of the test object. Often, for this purpose, the object filled with test gas is placed in a test chamber which together with an associated membrane sensor will be evacuated, thus allowing test gas to issue through possible leaks and to be detected by the membrane sensor. A quartz window sensor with heated membrane must have a very stable membrane temperature to prevent the test-gas signal from drifting. A drift of this signal will immediately enter the limit of detection. In case of a membrane with temperature-regulated heating device, the pump-off process during the evacuating of the test chamber is accompanied, due to the rapid pressure drop in the test chamber, by a distinct change of heat dissipation from the housing walls of the sensor, thus causing a signal drift to occur in spite of the temperature regulation. Consequently, only relatively large test-gas signals can be measured or, otherwise, one would have to wait for the lapse of unacceptably long settling times.

It is an object of the disclosure to provide a gas sensor wherein the desired temperature of the membrane is maintained with high constancy so that the stability of the signal of the gas sensor is increased and also small leakage rates can be reliably measured.

SUMMARY

A gas sensor which comprises, on its membrane, at least one second heating device which is regulated independently of the first heating device. By separate temperature regulation of separate regions of the membrane, different temperature influences can be separately compensated for. Thus, for instance, the central region of the membrane where no contact to other solids exists, can be subjected to an independent temperature regulation while also the edge region where the membrane is in contact with the housing, is subjected to an independent temperature regulation. Thereby, a high constancy of the membrane temperature can be achieved, even in situations of a massively varying total pressure, e.g. during the pumping-down of a test chamber from atmospheric pressure to the point of high vacuum.

Preferably, the first heating device is arranged in a region of the membrane which is not in direct contact with a wall of the housing while the second heating device is arranged in a region which is in direct contact with a wall of the housing. In this manner, a difference is established between "free regions" and "supported regions" of the membrane, and separate temperature regulation processes are performed in the two regions.

According to a further embodiment of the disclosure, also two or more heating devices can be provided, particularly along the edges of the membrane.

Preferably, each of the additional heating devices on the membrane is provided with its own contact pads. This allows for a simple electric contact and guarantees the independence of the individual additional heating devices. By way of alternative thereto, a plurality of said second heating devices can share the same contact pads. The first heating device suitably comprises a large number of heating islands while the second heating device consists of parallel conductor strips. The second heating device, which normally has a wall of the container arranged behind it, has only little influence on gas permeability. In this region, no permeation windows exist; there, the heating device can thus be of a relatively plain design.

An embodiment of the disclosure will be explained in greater detail hereunder with reference to the drawings.

DETAILED DESCRIPTION OF THE PREFERRED EMBODIMENT

Figure 1:
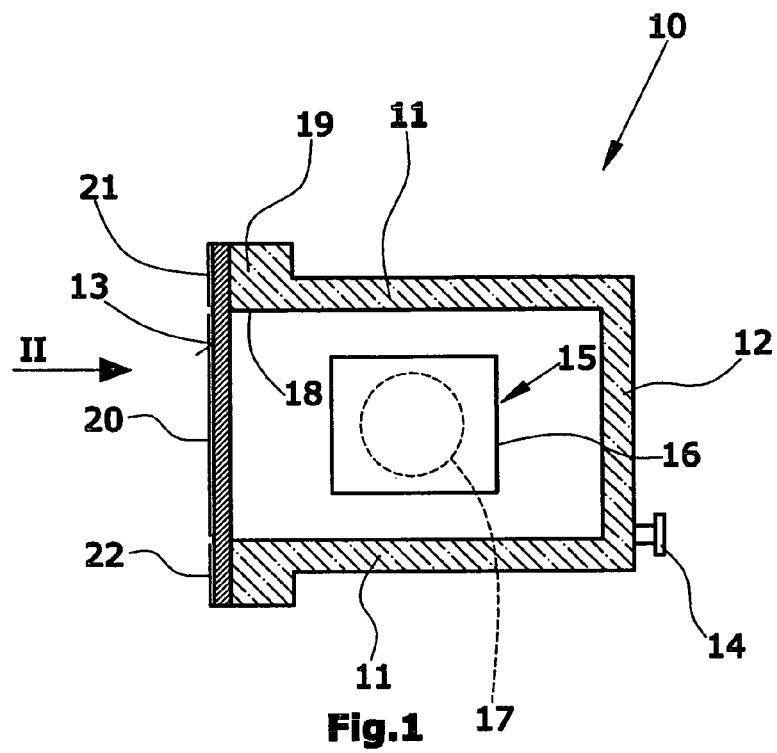
FIG. 1 is a schematic longitudinal sectional view of a gas-selective gas sensor.

The gas-pressure sensor illustrated herein comprises a housing 10 adapted to be evacuated, said housing having a rectangular cross section and being of a cup-shaped configuration. Housing 10 comprises four side walls 11 and one bottom wall 12. The side opposite bottom wall 12 is closed by a membrane 13. This membrane is gas-selectively permeable, e.g. to light gases such as helium and hydrogen. The permeability to gas requires a constant temperature of about 250° C.

The membrane 13 is made of silicon dioxide. The general design of the membrane is as described in DE 100 31 882 A1 or EP 0 831 964 B1.

Housing 10 is made of borosilicate glass. Because of the similarity of the materials of the membrane support 13 and the housing 10, both components can be bonded or molded to each other, thus obviating the need for adhesives or other sealing elements.

Housing 10 is in an evacuated state. For connection of a vacuum pump, the housing is provided with a connector 14 which in the operative condition is melted off or is closed in a vacuum-tight manner by other measures.

Accommodated in housing 10 is a gas-pressure sensor. In the present embodiment, said sensor consists of a Penning sensor such as described e.g. in DE 10 2004 034 381. Gas-pressure sensor 15 comprises two parallel cathode plates 16, only one of them being visible in FIG. 1. Between said cathode plates 16, an anode ring 17 is arranged, with its axis extending orthogonally to the plate plane. A voltage source is operative to deliver the direct current which is supplied between the cathode plates and the anode ring. In the electric circuit, a current measuring device is arranged for measuring the cathode or anode current. The magnetic field required for Penning discharge is generated by a permanent magnet arranged externally of the closed housing 10.

Figure 2:
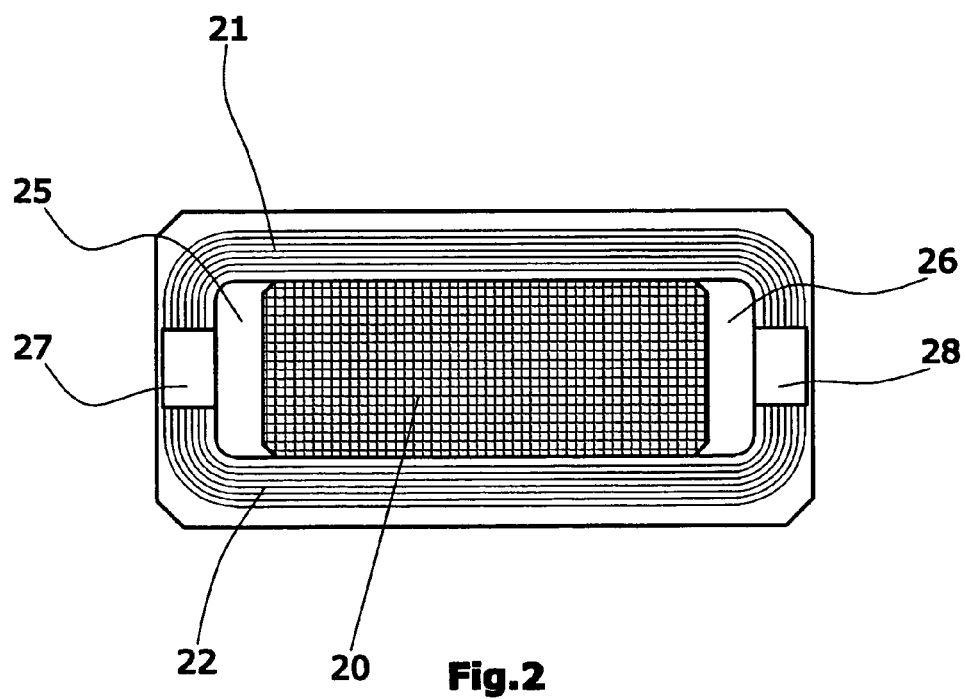
FIG. 2 is a view seen in the direction of the membrane as indicated by arrow II in FIG. 1.

FIG. 2 is a front view of the heating devices arranged on the side of the membrane 13 facing away from housing 10. A first heating device 20 is positioned in the central field of membrane 13 in front of that region which is not in contact with the wall of housing 10. The first heating device 20 is thus substantially congruent with the opening 18 (FIG. 1) at the front end of the container. The first heating device 20 consists of a large number of windows comprising meander-shaped helical heating elements according to EP 0 831 964 B1. The helical heating elements are platinum meanders which have been sputtered onto a thin wall layer of $SiO_2$. Said windows are arranged in a chessboard-like pattern and distributed in a uniform manner across the central region of membrane 13.

In the present embodiment, the housing 10 is provided with a flange 19 having the membrane 13 bonded to its end side. The edge of the membrane arranged in front of the end side is provided with a second heating device 21 and 22, respectively. Said second heating devices are arranged along the upper and lower edges of the opening 18 of the housing and guided around the corners of the front sides onto the smaller sides of the membrane where contact plates are located. On the vertical, smaller sides of opening 18, contact pads 25,26 and 27,28 are arranged; among these, the contact pads 25 and 26 are respectively connected to one end of the first heating device 20 and the contact pads 27,28 are connected to the ends of the heating devices 21 and 22.

While the meandering structures of the first heating device 20 are arranged in the form of a large number of windows or heating islands, both of the second heating devices 21 and 22 are realized as parallel conductor strips extending between the contact pads 27 and 28.

Each of the heating devices 20, 21 and 22 is individually temperature-regulated. They are kept at a constant temperature independently of each other. In this manner, a high constancy of the membrane temperature is accomplished, even in situations of considerably varying total pressure, such as e.g. during the evacuation of the environment of housing 10 from atmospheric pressure to high vacuum.

The invention claimed is:

1. A gas sensor comprising an evacuated housing closed by a gas-selectively permeable membrane, and a temperature-regulated first heating device arranged on the membrane, wherein the membrane is provided with at least one second heating device arranged thereon, said at least one second heating device being regulated independently of the first heating device, wherein the first heating device is arranged in a region of the membrane which is not in direct contact with a wall of the housing and that the second heating device is arranged in a region which is in direct contact with a wall of the housing.

2. The gas sensor according to claim 1, wherein two second heating devices are provided.

3. The gas sensor according to claim 2, wherein the second heating devices are arranged along two parallel edges of the membrane.

4. The gas sensor according to claim 2, wherein the second heating devices on the membrane have contact pads of their own.

5. The gas sensor according to claim 1, wherein the first heating device comprises a large number of heating islands and that the second heating device comprises parallel conductor strips.

6. A gas sensor comprising an evacuated housing closed by a gas-selectively permeable membrane, and a temperature-regulated first heating device arranged on the membrane, wherein the membrane is provided with at least one second heating device arranged thereon, said at least one second heating device being regulated independently of the first heating device, and wherein the first heating device comprises a large number of heating islands and that the second heating device comprises parallel conductor strips.

7. The gas sensor according to claim 6, wherein the first heating device is arranged in a region of the membrane which is not in direct contact with a wall of the housing and that the second heating device is arranged in a region which is in direct contact with a wall of the housing.

8. The gas sensor according to claim 6, wherein the parallel conductor strips are arranged along two parallel edges of the membrane.

9. The gas sensor according to claim 6, wherein the second heating devices on the membrane have contact pads of their own.

* * * * *